(12) United States Patent
Pillarisetty

(10) Patent No.: US 10,365,748 B2
(45) Date of Patent: Jul. 30, 2019

(54) SMART TOUCH LOCATION PREDICTOR BASED ON DIRECTION VECTOR

(71) Applicant: Samsung Electronics Co., Ltd, Suwon-si (KR)

(72) Inventor: Avinash Pillarisetty, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 171 days.

(21) Appl. No.: 14/963,033

(22) Filed: Dec. 8, 2015

(65) Prior Publication Data

US 2017/0160856 A1 Jun. 8, 2017

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04101* (2013.01)

(58) Field of Classification Search
CPC ...... G06F 3/0416; G06F 3/0412; G06F 3/044; G06F 2203/04101
See application file for complete search history.

(56) References Cited

U.S. PATENT DOCUMENTS

| 7,653,883 | B2 | 1/2010 | Hotelling et al. | |
|---|---|---|---|---|
| 2008/0012835 | A1* | 1/2008 | Rimon | G06F 3/038 345/173 |
| 2012/0260207 | A1 | 10/2012 | Treskunov et al. | |
| 2013/0222329 | A1* | 8/2013 | Larsby | G06F 3/04886 345/174 |
| 2016/0034069 | A1* | 2/2016 | Kohei | G06F 3/044 345/174 |

FOREIGN PATENT DOCUMENTS

| EP | 2259167 A1 | 12/2010 |
|---|---|---|
| EP | 2618239 A1 | 7/2013 |
| WO | WO2011/041055 A1 | 4/2011 |

OTHER PUBLICATIONS

Nikkei Technology; "Mitsubishi Demos '3D Touch Panel'" Tadashi, Nezu—Nikkei Electronics; http://techon.nikkeibp.co.jp/english/NEWS_En/20090310/166952/?P=1[Dec. 7, 2015 5:30:13 PM]—3 pages.

* cited by examiner

*Primary Examiner* — Peter D McLoone

(57) ABSTRACT

A method and electronic device for predicting a touch location. The method includes detecting a hover input over a touchscreen and computing a first point of the hover input that includes first x and y coordinates associated with a surface of the touchscreen and z coordinate first distance. The method further includes detecting a movement of the hover input over the touchscreen and computing a second point associated with the movement of the hover input that includes second x and y coordinates associated with the surface of the touchscreen and a z coordinate second distance. The method includes predicting the touch location that is expected to contact the surface of the touchscreen using a position vector determined based on the first point and the second point. The method may further include dynamically recalibrating the prediction based on newer points observed as and when the hover input hovers over the touchscreen.

20 Claims, 7 Drawing Sheets

SMART TOUCH LOCATION PREDICTOR BASED ON DIRECTION VECTOR

TECHNICAL FIELD

The present application relates generally to electronic devices including a smart phone touchscreen, and more specifically, to a smart touch location predictor based on direction vector.

BACKGROUND

A touchscreen of an electronic device (such as a smart phone, a tablet computer) is comprised based upon self and mutual capacitance values among other techniques. The self and mutual capacitance values are periodically read to determine where the touchscreen has been touched by a user. Alternatively, touch events are detected only after the user actually touched the screen. Some electronic devices including a touchscreen have gone past this limitation by increasing a threshold of capacitance to perform floating touch capabilities (such as air view technique). Although the air view technique may sense fingers hovering on a touchscreen, yet the air view technique has very limited use cases and certain limitations, for example, gestures without touching a touchscreen may not be recognized. Therefore, a method for effective touching events of a touchscreen (such as surface) based on a threshold of capacitance is needed to improve touchscreen operations and performance of electronic devices.

SUMMARY

Embodiments of the present disclosure provide a smart touch location predictor based on direction vector calculated based upon user's finger movements while approaching the touchscreen.

In one embodiment, a method for predicting a touch location is provided. The method includes detecting a hover input over a touchscreen associated with the electronic device and computing a first 3 dimensional point of the hover input that includes first x and y coordinates associated with a surface of the touchscreen and a first z coordinate that is a distance between the hover input and the touchscreen. The method further includes detecting a movement of the hover input over the touchscreen and computing a second 3 dimensional point associated with the movement of the hover input that includes second x and y coordinates associated with the surface of the touchscreen and a second z coordinate that is a distance between the moved hover input and the touchscreen. Additionally, the method includes predicting the touch location that is expected to contact the surface of the touchscreen using a position vector determined based on the first point and the second point.

In another embodiment an electronic device is provided. The electronic device includes a touchscreen and at least one processor. The at least one processor is configured to detect, via the touchscreen, a hover input over the touchscreen associated with the electronic device; and detect, via the touchscreen, a movement of the hover input over the touchscreen associated with the electronic device; and compute a first 3 dimensional point of the hover input that includes first x and y coordinates associated with a surface of the touchscreen and a first z coordinate that is a distance between the hover input and the touchscreen; compute a second 3 dimensional point associated with the movement of hover input that includes second x and y coordinates associated with the surface of the touchscreen and a second z coordinate that is a distance between the moved hover input and the touchscreen; and predict a touch location that is expected to contact the surface of the touchscreen using a position vector determined based on the first point and the second point.

In another embodiment a non-transitory computer-readable medium is provided. The non-transitory computer-readable medium includes program code, that when executed by at least one processor of an electronic device, causes the electronic device to detect a hover input over a touchscreen associated with the electronic device; compute a first 3 dimensional point of the hover input that includes first x and y coordinates associated with a surface of the touchscreen and a first z coordinate that is a distance between the hover input and the touchscreen; detect a movement of the hover input over the touchscreen; compute a second 3 dimensional point associated with the movement of the hover input, wherein the second point includes second x and y coordinates associated with the surface of the touchscreen and a second z coordinate that is a distance between the moved hover input and the touchscreen; and predict the touch location that is expected to contact the surface of the touchscreen using a position vector determined based on the first point and the second point.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A, B, and C.

Moreover, various functions described below can be implemented or supported by one or more computer programs, each of which is fruited from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device including a touchscreen.

Figure 1:
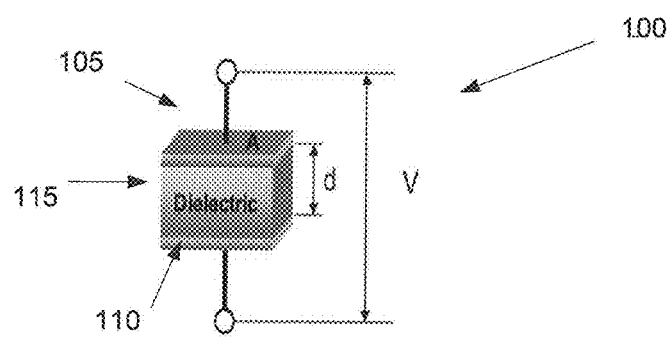
FIG. 1 illustrates an example configuration of a parallel-plate capacitor according to embodiments of the present disclosure.

FIG. 1 illustrates an example configuration of a parallel-plate capacitor 100 according to embodiments of the present disclosures. The parallel-plate capacitor 100 comprises an upper plate 105, a lower plate 110, and a dielectric 115. An embodiment of the parallel-plate capacitor 100 shown in FIG. 1 is for illustration only. Other embodiments are used without departing from the scope of the present disclosure.

Capacitance is directly proportional to the surface areas of the plates 105, 110 (such as the upper plate 105 and the lower plate 110), and inversely proportional to a distance (such as d) between the upper plate 105 and the lower plate 110 through the dielectric 115. Therefore, a theory of the capacitance is applied to an electronic device including a touchscreen. For example, a touchscreen of the electronic device is implemented as the lower plate 110 and a hover input of a user is implemented as the upper plate 105. For example, the hover input may be made using a user's finger, a pen, pencil, or any other suitable input device. Accordingly, if a voltage (such as v) is given between the upper plate 105 (such as the finger) and the lower plate 110, the capacitance is determined. According to the theory of capacitance (such as considering touch detection using self-capacitance), an approximate distance (such as d) between the touchscreen and the finger is obtained assuming other parameters are constant. The approximate distance between the touchscreen and the finger is obtained in accordance with equation (1):

$$C = \varepsilon_r \varepsilon_0 \frac{A}{d} \quad (1)$$

where C is the capacitance in Farads,
A is the area of overlap of the two plates in square meters,
$\varepsilon_r$ is the relative static permittivity of the dielectric material,
$\varepsilon_0$ is the permittivity of free space, and
d is the distance between the plates in meters.

One or more of the components illustrated in FIG. 1 may be implemented in specialized circuitry configured to perform the noted functions, or one or more of the components may be implemented by one or more processors executing instructions to perform the noted functions.

Figure 2:
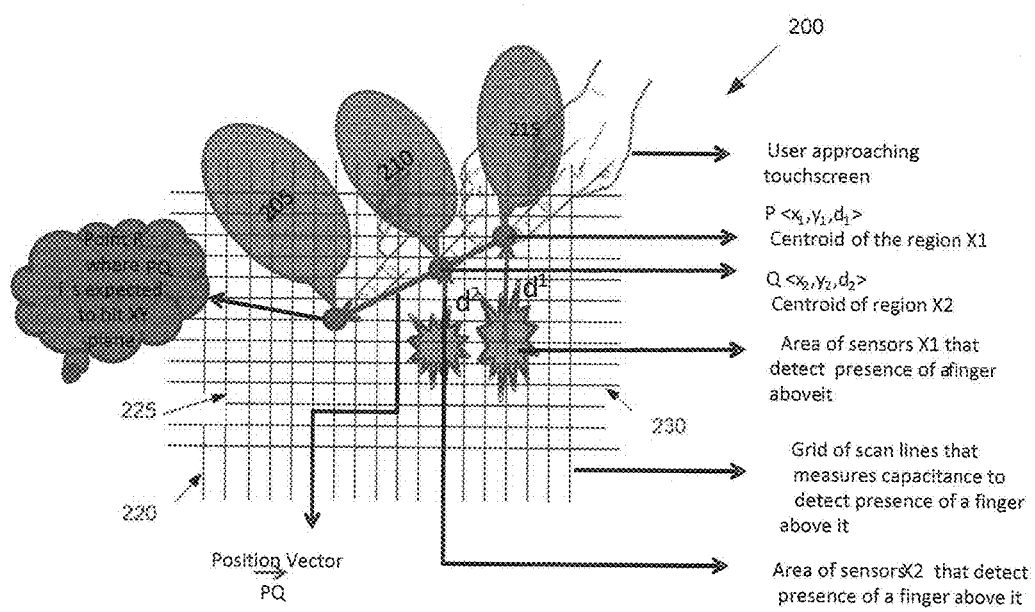
FIG. 2 illustrates an example motion event of a positional vector according to embodiments of the present disclosure.

FIG. 2 illustrates an example motion event of a positional vector 200 according to embodiments of the present disclosures. The motion event 200 comprises a first finger position 215, a second finger position 210, a third finger position 205, a grid of scan lines of Y-plane 220, an area of sensors 225, and a grid of scan lines of X-plane 230. The grids of scan lines 220, 230 measure a capacitance to detect the presence of a finger movement above the grid of scan lines of the Y-plane 220 and the X-plane 230. The area of sensors 225 also detects the presence of a finger movement above the area of sensors 225. An embodiment of the motion event of the positional vector 200 shown in FIG. 2 is for illustration only. Other embodiments are used without departing from the scope of the present disclosure.

The first finger point (P) 215 is determined as P <x1, y1, and d1>, where x1 is a grid of scan lines of an X-plane, y1 is a grid of scan lines of Y-plane, and d1 is a z coordinate that is a distance between a touchscreen and a finger movement. The second finger point (Q) 210 is determined as Q <x2, y2, and d2>, where x2 is a grid of scan lines of X-plane, y2 is a grid of scan lines of Y-plane, and d2 is a z coordinate that is a distance between the touchscreen and the finger movement. If a position vector (PQ) is determined in accordance with a direction of user finger movements (such as the first finger point (P) 215, the second finger point (Q) 210), a point R 205 at which the position vector (PQ) touches the XY touchscreen plane is the point a user intends to actually touch. Accordingly, the position vector (PQ) that is expected to hit X-Y plane in accordance with the first finger point (P) 215 and the second finger point (Q) 210 is obtained in accordance with the following equation (2) and the point R 205 shown in equation (3) is obtained by making the z coordinate of equation (2) equal to zero $$PQ(t) = <x1, y1, d1> + t <x2-x1, y2-y1, d2-d1> \quad (2)$$

$$R = <x1 + d1(x2-x1)/(d1-d2),\ y1 + d1(y2-y1)/(d1-d2),\ 0> \quad (3)$$

The point R 205 is determined as a probable touch point of the user by looking at position vector PQ and predicting the point R 205 where the distance between the touchscreen and the finger is reduced to zero. In addition, there are multiple points adjacent to the points P and the Q indicated by the first finger position and the second finger position that are effected by the capacitance. Centroids from these regions of interest points are identified as a single point of interest such as the point P and the point Q indicated by the first finger position and the second finger positions. The point P and the point Q constantly change and so does the position vector.

Other embodiments are used without departing from the scope of the present disclosure. One or more of the components illustrated in FIG. 2 may be implemented in specialized circuitry configured to perform the noted functions or one or more of the components may be implemented by one or more processors executing instructions to perform the noted functions.

Figure 3:
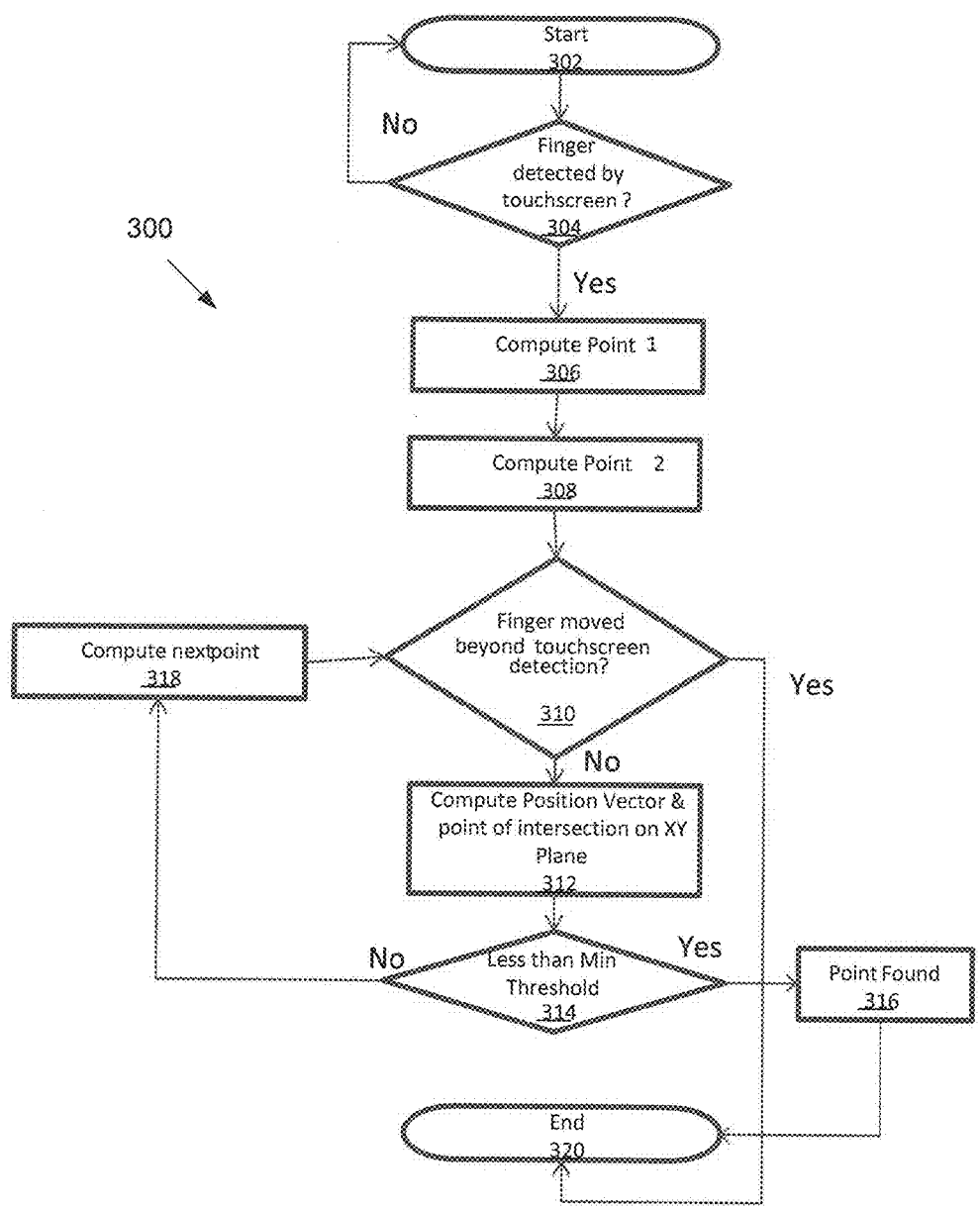
FIG. 3 illustrates an example flowchart of a method for a predicting touchscreen region that user intends to touch according to embodiments of the present disclosure.

FIG. 3 illustrates an example flowchart of a method 300 for predicting touchscreen region that user intends to touch according to embodiments of the present disclosures, as may be performed by a touch controller of an electronic device including a touchscreen. An embodiment of the method 300 shown in FIG. 3 is for illustration only. Other embodiments may be used without departing from the scope of the present disclosure.

As illustrated in FIG. 3, the method 300 begins at step 302. Subsequently, the method 300 proceeds to step 304, where the touch controller detects a finger movement on the touchscreen based on a preset value of a capacitance threshold below which any input device is observed by the touchscreen. If the touch controller detected the finger movements, the method proceeds to step 306, where the touch controller computes a point 1 comprising x1, y1, and d1 (such as point (P) illustrated in FIG. 2). Alternatively, if the touch controller does not detect the finger movements on the touchscreen, the method 300 proceeds to step 302. Subsequently, the method 300 proceeds to step 308, where the touch controller computes a point 2 comprising x2, y2, and d2 (such as point (Q) illustrated in FIG. 2).

Next, the method 300 proceeds to step 310, where the touch controller verifies if the finger is still within the touchscreen detection boundary. If the touch controller detects that the finger has moved away from the touchscreen detection capabilities (such as exceeding the preset capacitance threshold value above which any input device effects is not observed by the touchscreen), the method 300 proceeds to step 320 and finishes the step. If the touch controller detects that the finger is still detected by the touchscreen (such as the finger is still hovering the touchscreen), the method 300 proceeds to step 312, where the touch controller computes a position vector (PQ) (such as the position vector (PQ) illustrated in FIG. 2). Thereafter, the method 300 proceeds to step 314, where the touch controller compares a capacitance between the touchscreen and the finger with the minimum threshold that is pre-calibrated to be a minimum value below which the point is considered to have touched the screen. If the capacitance exceeds the minimum threshold, the method 300 proceeds to step 318, wherein the touch controller compute possible next point and recalibrate a new position vector (PQ) and then proceeds to step 310. If the capacitance does not exceed the minimum threshold, the method 300 proceeds to step 316, where the touch controller identifies the position vector (PQ) (such as illustrated in FIG. 2) and a point R (such as a touch location) that is expected to contact the surface of the touchscreen, and then finishes the step 316. Steps 314, 318, and 310 are performed multiple times before a condition for step 316 is satisfied and the last computed point R is identified as the expected point to touch the surface of touchscreen. In certain embodiments, the touch controller computes a centroid of the region as a point (P) and a point (Q). The touch controller determines a position vector (PQ) in accordance with the point (P) and the point (Q).

In certain embodiments, a touch controller is calibrated to increase a threshold of capacitance to sense a capacitance between a finger and a touchscreen without a contact (such as actual touching a touchscreen). Based on a first capacitance detected, an approximate distance (d) of the finger from the touchscreen is estimated. In such embodiments, the touch controller is modified to select a centroid (C) of a region among multiple sensors detecting the presence of the finger. In one embodiment, the centroid (C) of the region that includes all the points of active regions is obtained in accordance with the equation (4):

$$<(X^{max}-X^{min})/2+Xmin, (Y^{max}-Y^{min})/2+Ymin> \quad (4)$$

Where $X^{max}$ is the maximum number on the grid of scan lines in the X-plane, $X^{min}$ is the minimum number on the grid of scan lines in the X-plane, $Y^{max}$ is the maximum number on the grid of scan lines in the Y-plane, and $Y^{min}$ is the minimum number on the grid of lines in the Y-plane.

In another embodiment, the centroid (C) of the region is obtained with a sensor location with a maximum capacitance in the active regions. In such embodiments, the centeroid (C) is identified as the sensor location with the maximum capacitance in the active region. If the touch controller detects more capacitances between the touchscreen and the finger, the touch controller re-computes a position vector (PQ) and the point (R).

In certain embodiments, a touch controller detects gestures without touching a touchscreen. Based on a position vector (such as x, y, d) that is a 3 dimensional position vector, the gestures without touching the touchscreen is detected and interpreted.

In certain embodiments, velocity (such as scrolling speed) of a position vector (PQ) is obtained in accordance with equation (5):

$$\text{Velocity} = \Delta \text{ Displacement}/\Delta \text{ Time of a finger movement} \quad (5)$$

where a displacement is a motion of a finger moving from left to right or from right to left, or moving from top to bottom or from bottom to top with respect to the touchscreen.

In certain embodiments, an accuracy and performance of a next word and/or letter prediction in both space and time domain (such as complexities) are improved if at least one probable touch key is provided ahead of time into a prediction engine before an actual touching of the touchscreen. For example, a search space for a next word and/or letter is reduced by half with each prediction that leads to Log(n) complexity. Furthermore, a next word and/or letter is re-sized (such as enlarger) when the search space is determined according to the prediction in both space and time complexities.

One or more of the components illustrated in FIG. 3 may be implemented in specialized circuitry configured to perform the noted functions or one or more of the components may be implemented by one or more processors executing instructions to perform the noted functions (such as stylus, gloves and any computer like devices with a capacitive touch sensor and controller). Other embodiments are used without departing from the scope of the present disclosure.

Figure 4A:
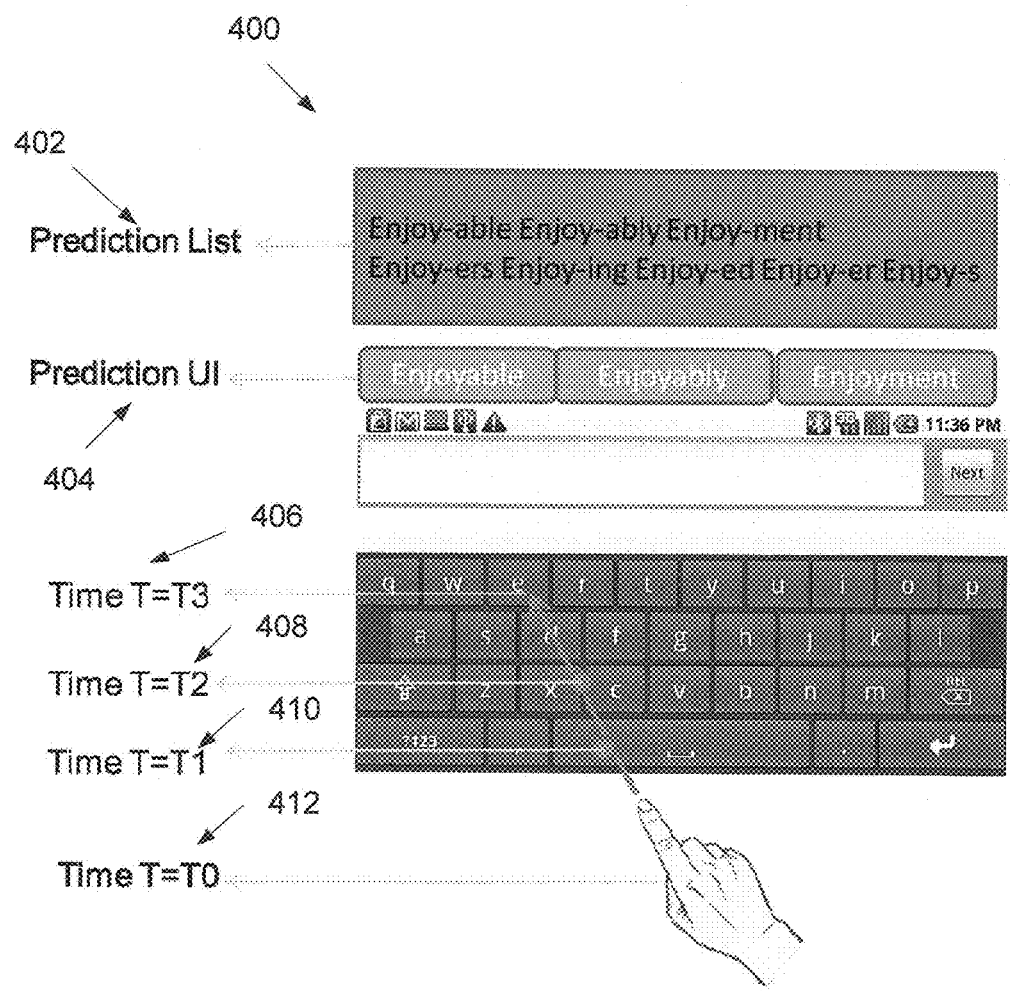
FIGS. 4A-4D illustrate an example prediction operation according to embodiments of the present disclosure.
Figure 4B:
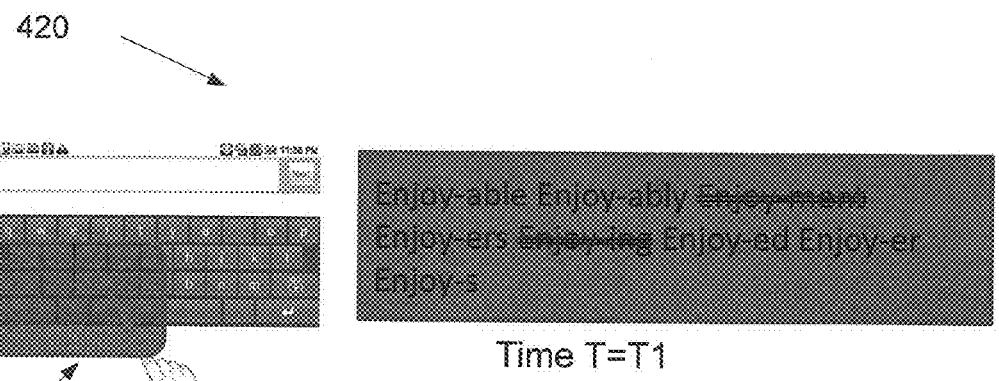
Figure 4C:
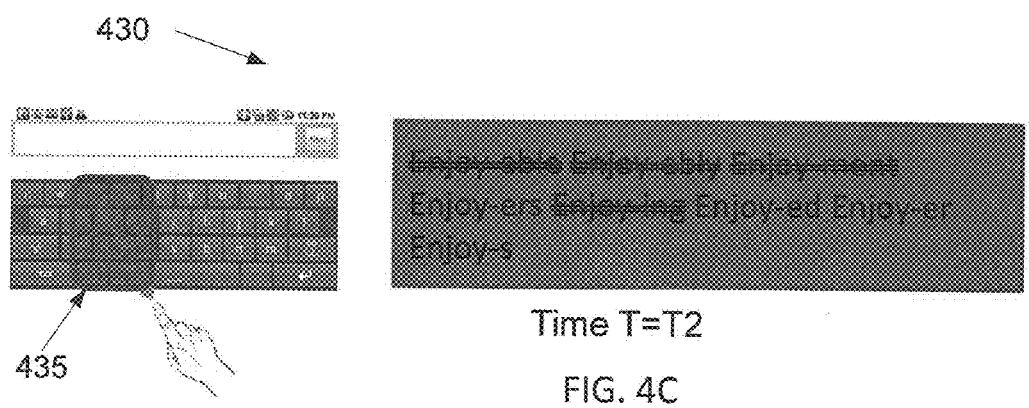
Figure 4D:
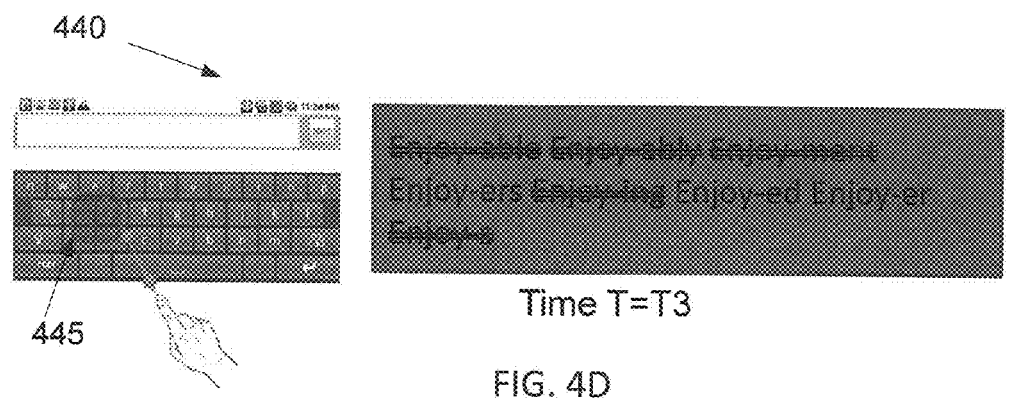

FIGS. 4A-4D illustrate example prediction operations 400, 420, 430, 440 according to embodiments of the present disclosures. More specifically, FIGS. 4B-4D illustrate an example step of FIG. 4A (such as 406, 408, 410). The prediction operation 400 comprises a prediction list 402, a prediction user interface (UI) 404, a finger position at time T3 406, a finger position at time T2 408, a finger position at time T1 410, and a finger position at time T0 412. An embodiment of the prediction operations 400, 420, 430, 440 shown in FIGS. 4A-4D is for illustration only. Other embodiments may be used without departing from the scope of the present disclosure.

As illustrated in FIG. 4A, a user wants to enter "I Enjoyed" using an electronic device including a touchscreen. The user already entered "I Enjoy" and wants to key in "e". The prediction UI 404 displays all possible letters and/or words such as "Enjoy-able", "Enjoy-ably", "Enjoy-ment", "Enjoy-ers", "Enjoy-ing", "Enjoy-ed", and "Enjoy-s" on the touchscreen according to the prediction list 402 that identifies all possible letters and/or words for next key entering.

FIG. 4B illustrates a step of a prediction of a finger movement 420 illustrated in FIG. 4A. As illustrated in FIG. 4B, a touch controller detects a finger position at time T1 410 (such as R illustrated in FIG. 2). Accordingly, the touch controller predicts that the user wants to enter at least one key that is located in a predication area of the finger movement T1 410 on the touchscreen. For example, the touch controller predicts and calculates a position R as illustrated in FIG. 2. Therefore, the touch controller removes "Enjoy-ment" and "Enjoy-ing" including {m, i} from the prediction list 402 because those words are not in a probable search space 425 for a next step. Accordingly, the prediction UI 404 displays complete possible letters and/or words (such as "Enjoyable", "Enjoyably", "Enjoyers", "Enjoyed", "Enjoyer", and "Enjoys") for a next key entering on the touchscreen.

FIG. 4C illustrates a step of a prediction of a finger movement 430 illustrated in FIG. 4A. As illustrated in FIG. 4C, the touch controller detects a new point at T2 408 (such as 318 in FIG. 3). Accordingly, the touch controller removes "Enjoy-ment", "Enjoy-ing", "Enjoy-able" and "Enjoy-ably" including {j, a, m, i} from the prediction list 402 because those words are not in a probable search space 435 for a next step. Accordingly, the prediction UI 404 displays complete possible letters and/or words (such as "Enjoyers", "Enjoyed", "Enjoyer", and "Enjoys") for a next key entering on the touchscreen. As the distance between the finger and probable touch point decreases so does the search space. In one example, the search space used in 425 as illustrated in FIG. 4B is greater than the search space 435 as illustrated in FIG. 4C.

FIG. 4D illustrates a step of a prediction of a finger movement 440 illustrated in FIG. 4A. As illustrated in FIG. 4D, the touch controller detects a new finger point at T3 406. Accordingly, the touch controller predicts that the user wants to enter at least one key that is located in a much smaller predication area of the finger movement T3 406 on the touchscreen. the touch controller removes "Enjoy-ment", "Enjoy-ing", "Enjoy-able", "Enjoy-ably", and "Enjoy-s" including {j, a, m, i, s} from the prediction list 402 because those words are not in a probable search space 445 for a next step. Accordingly, the prediction UI 404 displays complete possible letters and/or words (such as "Enjoyers", "Enjoyed", and "Enjoyer") for a next key entering on the touchscreen.

One or more of the components illustrated in FIGS. 4A-4D may be implemented in specialized circuitry configured to perform the noted functions or one or more of the components may be implemented by one or more processors executing instructions to perform the noted functions. Other embodiments are used without departing from the scope of the present disclosure.

Figures 5A, 5B:
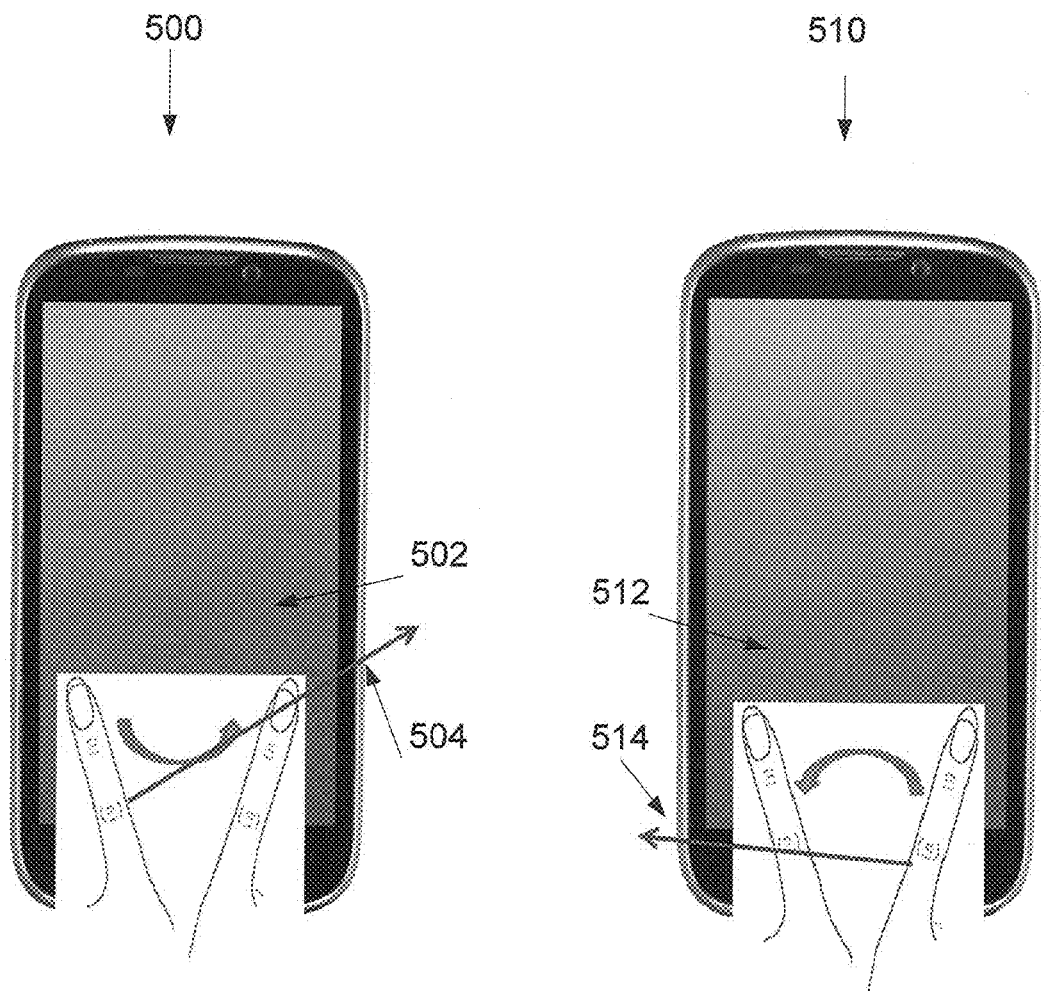
FIGS. 5A-5B illustrate another example prediction operation according to embodiments of the present disclosure.

FIGS. 5A-5B illustrate another example prediction operations 500, 510 according to embodiments of the present disclosures. The prediction operation 500 comprises a touchscreen 502 and a finger gesture 504 moving from left to right. The prediction operation 510 comprises a touchscreen 512 and a finger gesture 514 moving from right to left. An embodiment of the prediction operations 500, 510 shown in FIGS. 5A and 5B, respectively, is for illustration only. Other embodiments may be used without departing from the scope of the present disclosure.

As illustrated in FIG. 5A, the gesture 504 on the touchscreen 502 is detected by a touch controller including a touch control method according to embodiments of the present of the disclosures. As illustrated in FIG. 5B, the gesture 514 on the touchscreen 512 is also detected by the touch controller including the touch control method according to embodiments of the present disclosures.

As illustrated in FIG. 5A-5B, the gestures 504, 514 are detected using a directional vector changing (such as P, Q, and PQ). In addition, a rate of change of direction vector is determined by a velocity of an action as described in equation (4). The velocity of the action is applied to a scrolling page with a particular speed.

One or more of the components illustrated in FIGS. 5A-5B may be implemented in specialized circuitry configured to perform the noted functions or one or more of the components may be implemented by one or more processors executing instructions to perform the noted functions. Other embodiments are used without departing from the scope of the present disclosure.

Figure 6A:
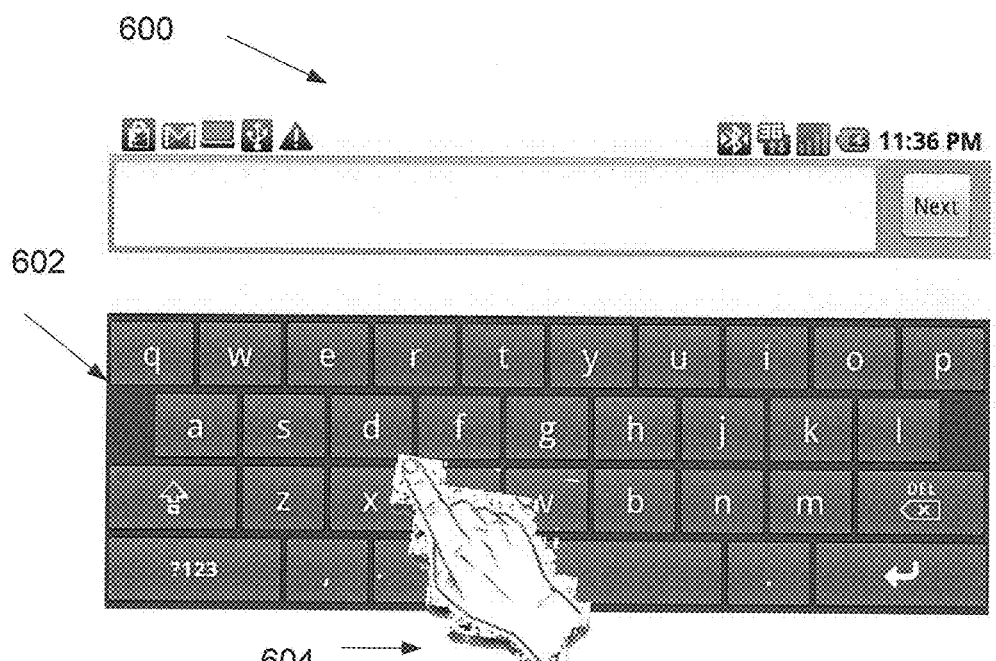
FIGS. 6A-6B illustrate yet another example prediction operation according to embodiments of the present disclosure.
Figure 6B:
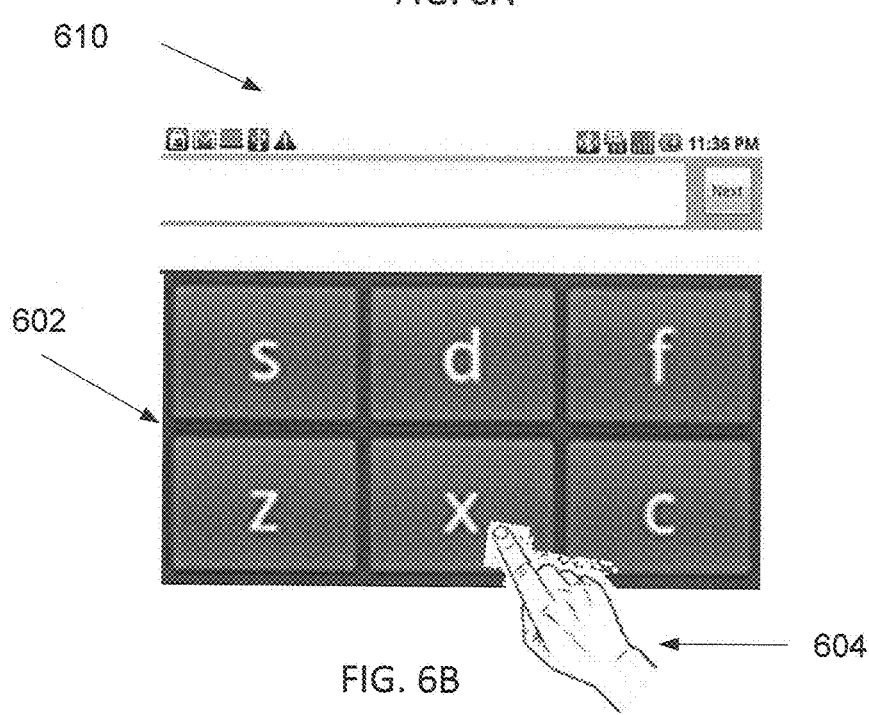

FIGS. 6A-6B illustrate yet another example prediction operations 600, 610 according to embodiments of the present disclosures. The prediction operation 600 illustrated in FIG. 6A comprises a dynamic virtual keyboard 602 implemented on a touchscreen and a finger movement 604. The prediction operation 610 illustrated in FIG. 6B comprises an enlarged dynamic virtual keyboard 602 implemented on the touchscreen and the finger movement 604. An embodiment of the prediction operations 600, 610 shown in FIGS. 6A-6B is for illustration only. Other embodiments may be used without departing from the scope of the present disclosure.

As illustrated in FIG. 6A-6B, the dynamic virtual keyboard 602 is possibly re-sized when the finger movement 604 approaches a touchscreen within a particular distance (such as a capacitance between the touchscreen and the finger). For example, when the finger movement 604 illustrated in FIG. 6A approaches a specific area including a letter "d" and a letter "x", the dynamic virtual keyboard 602 is enlarged to show the specific area including a bigger letter "d" and a bigger letter "x" as illustrated in FIG. 6B. Accordingly, a user wants to key in a letter "x" but most likely might key a letter "d" as illustrated in FIG. 6A, but the user hit the letter "x" with greater accuracy using the dynamic virtual keyboard that is dynamically re-sized itself as the finger movement approaches close. As a result, the prediction operation 610 as illustrated in FIG. 6B solves a problem of accidental neighboring key pressing and actually increases an accuracy of hitting the right key in the first attempt.

One or more of the components illustrated in FIG. 6A-6B may be implemented in specialized circuitry configured to perform the noted functions or one or more of the components may be implemented by one or more processors executing instructions to perform the noted functions. Other embodiments are used without departing from the scope of the present disclosure.

Figure 7:
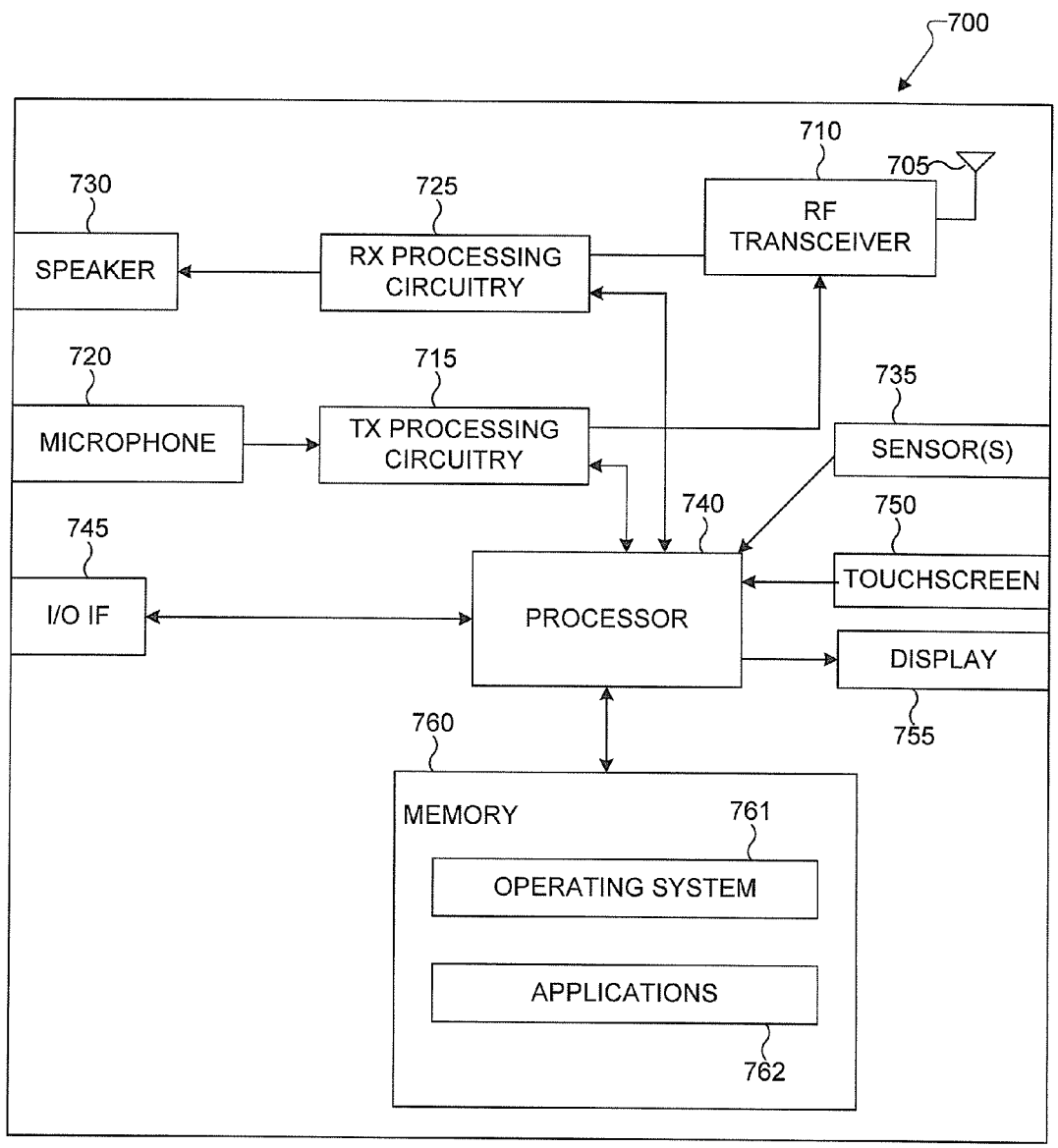
FIG. 7 illustrates an example electronic device according to embodiments of the present disclosure.

FIG. 7 illustrates an example electronic device 700 according to this disclosure. The electronic device 700 is an example device that may be used to implement the various functions and features disclosed herein. The embodiment of the electronic device 700 illustrated in FIG. 7 is for illustration only. Electronic devices come in a wide variety of configurations, and FIG. 7 does not limit the scope of this disclosure to any particular implementation of an electronic device.

As shown in FIG. 7, the electronic device 700 includes an antenna 705, a radio frequency (RF) transceiver 710, TX processing circuitry 715, a microphone 720, and receive (RX) processing circuitry 725. The electronic device 700 also includes a speaker 730, a processor 740, an input/output (I/O) interface (IF) 745, a touchscreen 750, a display 755, and a memory 760. The memory 760 includes an operating system (OS) 761 and one or more applications 762.

The RF transceiver 710 receives, from the antenna 705, an incoming RF signal transmitted by an eNB of the network 100. The RF transceiver 710 down-converts the incoming RF signal to generate an intermediate frequency (IF) or baseband signal. The IF or baseband signal is sent to the RX processing circuitry 725, which generates a processed baseband signal by filtering, decoding, and/or digitizing the baseband or IF signal. The RX processing circuitry 725 transmits the processed baseband signal to the speaker 730 (such as for voice data) or to the processor 740 for further processing (such as for web browsing data).

The TX processing circuitry 715 receives analog or digital voice data from the microphone 720 or other outgoing baseband data (such as web data, e-mail, or interactive video game data) from the processor 740. The TX processing circuitry 715 encodes, multiplexes, and/or digitizes the outgoing baseband data to generate a processed baseband or IF signal. The RF transceiver 710 receives the outgoing processed baseband or IF signal from the TX processing circuitry 715 and up-converts the baseband or IF signal to an RF signal that is transmitted via the antenna 705.

The processor 740 can include one or more processors and execute the basic OS program 761 stored in the memory 760 in order to control the overall operation of the electronic device 700. In some embodiments, the processor 740 includes at least one microprocessor or microcontroller.

The processor 740 is also capable of executing other processes and programs resident in the memory 760, such as operations that detect hovering input locations and predict contact locations with the touchscreen 750. The processor 740 can move data into or out of the memory 760 as required by an executing process. In some embodiments, the processor 740 is configured to execute a plurality of applications 762, such as applications for detecting hover input locations and predict contact locations with the touchscreen 750.

The processor 740 can operate the plurality of applications 762 based on the OS program 761. The main processor 740 is also coupled to the I/O interface 745, which provides electronic device 700 with the ability to connect to other devices such as laptop computers and handheld computers. The I/O interface 745 is the communication path between these accessories and the processor 740.

The electronic device 700 further includes one or more sensors 735 that can meter a physical quantity or detect a hover input over the electronic device 700, and convert metered or detected information into an electrical signal. For example, sensor 735 may include a gesture sensor, a gyroscope or gyro sensor, an air pressure sensor, a magnetic sensor or magnetometer, an acceleration sensor or accelerometer, a grip sensor, a proximity sensor, the sensor(s) 735 can further include a control circuit for controlling at least one of the sensors included therein. As discussed above, one or more of these sensor(s) 735 may be used to detect inputs including hover inputs.

The processor 740 is also coupled to the touchscreen 750 and the display 755. The operator of the electronic device 700 can use the touchscreen 750 to enter inputs including hover inputs to the electronic device 700. The display 755 may be a liquid crystal display, light emitting diode display, or other display capable of rendering text and/or at least limited graphics, such as from web sites.

The touchscreen 750 can include a touch panel, a (digital) pen sensor, a key, or an ultrasonic input device. The touchscreen 750 can recognize, for example, a touch input in at least one scheme among a capacitive scheme, a pressure sensitive scheme, an infrared scheme, or an ultrasonic scheme. The touchscreen 750 can also include a control circuit. In the capacitive scheme, the touchscreen 750 can recognize touch or proximity.

The memory 760 is coupled to the processor 740. Part of the memory 760 could include a random access memory (RAM), and another part of the memory 760 could include a Flash memory or other read-only memory (ROM).

Although FIG. 7 illustrates an example electronic device, various changes may be made to FIG. 7. For example, various components in FIG. 7 could be combined, further subdivided, or omitted and additional components could be added according to particular needs. As a particular example, the main processor 740 could be divided into multiple processors, such as one or more central processing units (CPUs) and one or more graphics processing units (GPUs). Also, while FIG. 7 illustrates the electronic device 700 configured as a mobile telephone, smartphone, or tablet, electronic devices could be configured to operate as other types of mobile or stationary devices including, for example, standalone display devices that do not include wireless communication components. In addition, as with computing and communication networks, electronic devices come in a wide variety of configurations, and FIG. 7 does not limit this disclosure to any particular electronic devices.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method for predicting a touch location, the method comprising:

detecting, by an electronic device, a hover input over a touchscreen associated with the electronic device;

in response to detecting the hover input, selecting a region associated with the hover input, the region determined by a maximum number and a minimum number on a grid of scan lines for each dimension of a coordinate plane of the touchscreen;

computing, by the electronic device, a first point of the hover input that includes first x and y coordinates associated with a surface of the touchscreen and a z coordinate that includes a first distance between the hover input and the touchscreen;

detecting, by the electronic device, a movement of the hover input over the touchscreen;

computing, by the electronic device, a second point associated with the movement of the hover input, wherein the second point includes second x and y coordinates associated with the surface of the touchscreen and a z coordinate that includes a second distance between the moved hover input and the touchscreen; and predicting the touch location that is expected to contact the surface of the touchscreen using a position vector determined based on the first point and the second point, wherein the position vector is calibrated based on a next point that is obtained from further movement of the hover input over the touchscreen.

2. The method of claim 1, wherein computing the first point comprises:
calibrating a threshold of capacitance to sense the hover input; and
estimating the first distance between the hover input and the touchscreen in accordance with the threshold of capacitance that was calibrated.

3. The method of claim 2, wherein the threshold of capacitance is determined by a capacitance between the touchscreen and the hover input, a distance between the touchscreen and the hover input, or combinations thereof.

4. The method of claim 2, further comprising re-computing the position vector when the electronic device detects a capacitance exceeding the threshold of capacitance.

5. The method of claim 1, wherein the position vector is given by:

$$PQ(t) = \langle x1, y1, d1 \rangle + t\langle x2-x1, y2-y1, d2-d1 \rangle$$

where x1 is a first x coordinate, y1 is a first y coordinate, d1 is a first distance, x2 is a second x coordinate, y2 is a second y coordinate, d2 is a second distance, and t is a time.

6. The method of claim 1, wherein the touch location that is expected to contact the surface of the touchscreen is given by:

$$R = \langle x1 + d1(x2-x1)/(d1-d2),\ y1 + d1(y2-y1)/(d1-d2),\ 0 \rangle$$

where R is a probable point of the touchscreen that is expected to contact the surface of the touchscreen, where x1 is a first x coordinate, y1 is a first y coordinate, d1 is a first distance, x2 is a second x coordinate, y2 is a second y coordinate, d2 is a second distance.

7. The method of claim 1, wherein computing the first point comprises computing the first point in accordance with a centroid of the region and the first distance, and
wherein computing the second point comprises computing the second point in accordance with the centroid of the region and the second distance.

8. The method of claim 1, wherein a centroid of the region is given by:

$$(X^{max} - X^{min})/2 + X\min,\ (Y^{max} - Y^{min})/2 + Y\min$$

where $X^{max}$ is a maximum number on the grid of scan lines in an X-plane of the touchscreen, $X^{min}$ is a minimum number on the grid of scan lines in the X-plane, $Y^{max}$ is a maximum number on the grid of scan lines in a Y-plane of the touchscreen, and $Y^{min}$ is the minimum number on the grid of scan lines in the Y-plane, and wherein the $X^{max}$, $X^{min}$, $Y^{max}$, and $Y^{min}$ are obtained in an active region on the touchscreen.

9. The method of claim 8, wherein the active region includes the centroid of the region that is obtained in accordance with a sensor location with a maximum capacitance.

10. The method of claim 1, further comprising:
predicting the touch location including at least one probable touch key on the touchscreen that is activated before actual touching event of the touchscreen;
reducing a search space for a next inputting in accordance with the prediction using the position vector to predict a touch location on the touchscreen; and
dynamically resizing the touch location on the touchscreen that is an expected touch location for the next inputting in accordance with the reduced search space, wherein the touch location is a virtual keyboard on the touchscreen that is enlarged or highlighted.

11. An electronic device comprising:
a touchscreen; and
at least one processor configured to:
detect, via the touchscreen, a hover input over the touchscreen associated with the electronic device;
in response to detecting the hover input, select a region associated with the hover input, the region determined by a maximum number and a minimum number on a grid of scan lines for each dimension of a coordinate plane of the touchscreen;
detect, via the touchscreen, a movement of the hover input over the touchscreen associated with the electronic device;
compute a first point of the hover input that includes first x and y coordinates associated with a surface of the touchscreen and z coordinate associated with a first distance between the hover input and the touchscreen;
compute a second point associated with the movement of the hover input that includes second x and y coordinates associated with the surface of the touchscreen and z coordinate associated with a second distance between the moved hover input and the touchscreen; and
predict a touch location that is expected to contact the surface of the touchscreen using a position vector determined based on the first point and the second point, wherein the position vector is calibrated based on a next point that is obtained from further movement of the hover input over the touchscreen.

12. The electronic device of claim 11, wherein the electronic device comprises a touch controller and a touch sensor, and wherein the touch location that is expected to contact the surface of the touchscreen using the position vector is determined based on an XY plane of the touchscreen and a point on position vector intersecting the XY plane and a z coordinate having a zero.

13. The electronic device of claim 11, wherein the at least one processor is further configured to:
calibrate a threshold of capacitance to sense the hover input; and estimate the first distance between the hover input and the touchscreen in accordance with the threshold of capacitance that was calibrated.

14. The electronic device of claim 11, wherein the at least one processor is further configured to:
compute the first point in accordance with a centroid of the region and the first distance; and
compute the second point in accordance with the centroid of the region and the second distance.

15. The electronic device of claim 11, wherein the at least one processor is configured to:
predict the touch location including at least one probable touch key on the touchscreen that is activated before actual touching event of the touchscreen;
reduce a search space for a next inputting in accordance with a result of the prediction using the position vector to predict a touch location on the touchscreen; and
dynamically resize the touch location on the touchscreen that is an expected touch location for the next inputting in accordance with the reduced search space, wherein the touch location is a virtual keyboard on the touchscreen that is enlarged or highlighted.

16. A non-transitory computer-readable medium comprising program code, that when executed by at least one processor of an electronic device, causes the electronic device to:
detect a hover input over a touchscreen associated with the electronic device;
in response to detecting the hover input, select a region associated with the hover input, the region determined by a maximum number and a minimum number on a grid of scan lines for each dimension of a coordinate plane of the touchscreen;
compute a first point of the hover input that includes first x and y coordinates associated with a surface of the touchscreen and z coordinate that includes a first distance between the hover input and the touchscreen;
detect a movement of the hover input over the touchscreen;
compute a second point associated with the movement of the hover input, wherein the second point includes second x and y coordinates associated with the surface of the touchscreen and z coordinate that includes a second distance between the moved hover input and the touchscreen; and
predict a touch location that is expected to contact the surface of the touchscreen using a position vector determined based on the first point and the second point.

17. The non-transitory computer-readable medium of claim 16, wherein the program code that causes the electronic device to calculate the first point comprises program code, that when executed by at least one processor of an electronic device, causes the electronic device to:
calibrate a threshold of capacitance to sense the hover input; and
estimate the first distance between the hover input and the touchscreen in accordance with the threshold of capacitance that was calibrated.

18. The non-transitory computer-readable medium of claim 17, further comprising program code, that when executed by at least one processor of an electronic device, causes the electronic device to re-compute the position vector when the electronic device detects a capacitance exceeding the threshold of capacitance.

19. The non-transitory computer-readable medium of claim 16, further comprising program code, that when executed by at least one processor of an electronic device, wherein the program code that causes the electronic device to calculate the first point comprises program code, that when executed by at least one processor of an electronic device, causes the electronic device to compute the first point in accordance with a centroid of the region and the first distance; and
wherein the program code that causes the electronic device to calculate the second point comprises program code, that when executed by at least one processor of an electronic device, causes the electronic device to compute the second point in accordance with the centroid of the region and the second distance.

20. The non-transitory computer-readable medium of claim 16, further comprising program code, that when executed by at least one processor of an electronic device, causes the electronic device to:
predict the touch location including at least one probable touch key on the touchscreen that is activated before actual touching event of the touchscreen;
reduce a search space for a next inputting in accordance with a result of the prediction using the position vector to predict a touch location on the touchscreen; and
dynamically resize the touch location on the touchscreen that is the expected touch location for the next inputting in accordance with the reduced search space, wherein the touch location is a virtual keyboard on the touchscreen that is enlarged or highlighted.

* * * * *